United States Patent Office 3,506,534
Patented Apr. 14, 1970

3,506,534
SURFACE TEXTURED GLASS LAMINATION AND PROCESS OF PRODUCING THE SAME
Peggy D. Finan, 9 Gainsborough Close,
Cambridgeshire, Cambridge, England
No Drawing. Filed Aug. 2, 1967, Ser. No. 657,752
Claims priority, application Great Britain, Aug. 8, 1966, 35,425/66
Int. Cl. B32b *3/26, 5/18*
U.S. Cl. 161—159   3 Claims

ABSTRACT OF THE DISCLOSURE

A method of producing a decorative glass laminate having at least one textured surface by sandwiching between two sheets of glass a glaze base which generates a gas when heated and heating said sheets to a temperature sufficient to soften them and cause the glaze base to fuse the sheets together while generating a gas which forms bubbles in at least one of the softened sheets, these bubbles having external surfaces which protrude from and texturize the surface of at least one softened sheet.

---

This invention relates to the production of textured art glass which incorporates bubbles and may also be stained with various colours.

In accordance with the invention a glass lamination is produced by fusing together at least two sheets of glass with a glaze sandwiched between them, the glaze base consisting of between 50 and 100 parts of lead oxide, between 10 and 30 parts of borax, and between 20 and 100 parts of flint powder (silica). The preferred glaze base consists of 60 parts of lead oxide, 20 parts of borax, and 20 parts of flint powder.

At the temperature at which the sheets of glass are fused together, the glaze reacts chemically and evolves a gas which expands and forces the sheets of glass apart at points of weakness, producing bubbles in the lamination and hence texturing of at least one face of the lamination.

The lamination may be stained internally with one or more different colours. For this purpose colourants or obscurants may be added to the glaze base. Typical colours and the necessary additives are as follows:

Cobalt blue: between 2 and 6 parts, preferably 3 parts, of cobalt oxide.
Turquoise blue: between 3 and 9 parts, preferably 6 parts, of black copper oxide.
Deep turquoise blue: up to 1 part of cobalt oxide and between 3 and 9 parts, preferably 6 parts of black copper oxide.
Moss green: between 10 and 20 parts, preferably 15 parts, of red iron oxide.
Grass green: up to 1 part of cobalt oxide, and between 3 and 6 parts, preferably 4 parts, of potassium chromate.
Violet red: between 2 and 7 parts, preferably 3 parts, of manganese oxide.
Amber: between 2 and 6 parts, preferably 3 parts of manganese oxide, and between 2 and 6 parts, preferably 3 parts, of potassium bichromate.
Blackberry: between 2 and 4 parts, preferably 3 parts, of cobalt oxide and between 4 and 8 parts, preferably 6 parts, of black copper oxide.
Yellow: between 2 and 6 parts, preferably 3 parts, of potassium bichromate.

Typical obscurants and the necessary additives are as follows:

Grisaya Negro: between 40 and 60 parts of lead bisilicate and between 30 and 60 parts of black iron oxide.
Grisaya Castano: between 40 and 60 parts of lead bisilicate and between 30 and 60 parts of red iron oxide.

Other decorative internal effects can be produced by placing shaped pieces of copper or brass foil, or wire mesh between the sheets before they are fused.

The resulting lamination may have a wide variety of texture and colour and the internal bubbles provide a very pleasing effect, particularly optical effects with transmitted light. The laminations may be used to make up small articles, such as pendant brooches, or may be formed in strips which are hung together to form, for example, lampshades. Large panels of the lamination may be used in the production of screens, stained windows, and mosaics, and even in the cladding of building structures. Many sheets of glass may be laminated together in this way to produce decorative blocks which may be suitably mounted to form ornaments.

In one example a lamination is produced from two sheets of soda window glass with a guage of between 16 and 30 ozs. weight. The pieces of glass are cut to the same size and the glaze is applied to the face of one of the sheets of glass. The other sheet of glass is placed over the first sheet with the glaze sandwiched between them and the two sheets fit together as exactly as possible. The lamination is placed in an electric kiln on a shelf of which is covered with Plaster of Paris powder. The kiln is then fired to a temperature of between 600° C. and 800° C., preferably 700° C. After firing the lamination is ready for mounting. In this case the majority of the texturing will appear on that face of the lamination which is uppermost during the firing.

A lamination may be mounted by means of a wire loop the ends of which are trapped between the sheets of glass at an edge of the lamination during the firing.

I claim:
1. A method of producing a decorative glass laminate having at least one textured surface, which method comprises the steps of sandwiching between two sheets of glass a glaze base which generates a gas when heated, said glaze base consisting essentially of 60 parts of lead oxide, of 20 parts of borax, and of 20 parts of flint powder, and heating said sheets to a temperature sufficient to soften said sheets and cause said glaze base to fuse said sheets together while generating a gas, said glaze base being so sandwiched between said sheets and the thickness of said sheets being such that said generated gas forms bubbles in at least one of said softened sheets, the external surfaces of which bubbles protrude from and texturize the surface of said at least one sheet.

2. A method according to claim 1, in which the glaze further consists of conventional glass colourant or obscurant.

3. A decorative glass laminate comprising two glass sheets secured together by a layer of the reaction product produced when a glaze consisting essentially of 20 parts borax, of 60 parts of lead oxide and of 20 parts of flint powder is heated to a temperature between 600 and 800° C., said laminate being characterized by the fact that at least one of said sheets has a textured surface defined in part by the external surfaces of internal bubbles formed in situ in said textured sheet.

References Cited

UNITED STATES PATENTS

| | | | |
|---|---|---|---|
| 1,156,213 | 10/1915 | Cox | 65—44 |
| 2,264,183 | 11/1941 | Nash | 65—43 |
| 2,347,556 | 4/1944 | Griffith | 65—44 |
| 2,866,298 | 12/1958 | Babcock | 65—43 |
| 3,024,120 | 3/1962 | Babcock | 65—134 |
| 3,364,041 | 1/1968 | Swain | 65—134 |
| 3,184,371 | 5/1965 | Seiol | 161—193 |

S. LEON BASHORE, Primary Examiner

E. R. FREEDMAN, Assistant Examiner

U.S. Cl. X.R.

65—22, 43, 60; 161—193